June 11, 1968 D. L. WIGGINS 3,387,775

CONVERTER FOR TAPE PERFORATOR

Filed July 7, 1965 5 Sheets-Sheet 1

INVENTOR
D. L. WIGGINS

BY J. B. Hoofnagle, Jr.

ATTORNEY

June 11, 1968 D. L. WIGGINS 3,387,775
CONVERTER FOR TAPE PERFORATOR
Filed July 7, 1965 5 Sheets-Sheet 2
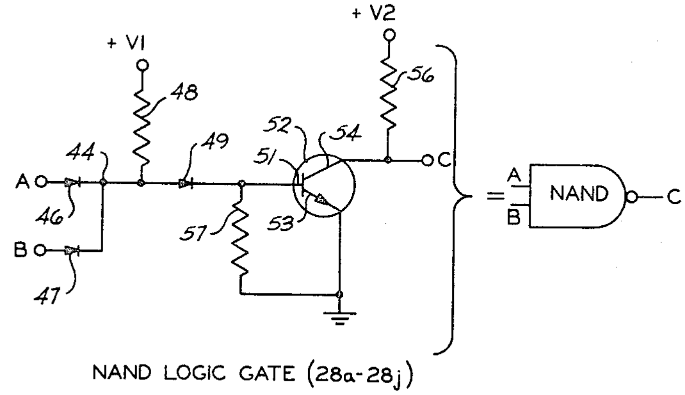
FIG. 2
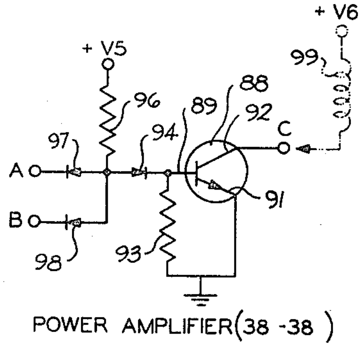
FIG. 6
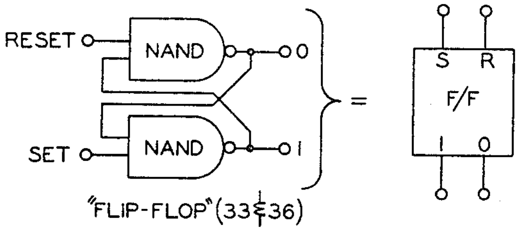
FIG. 3
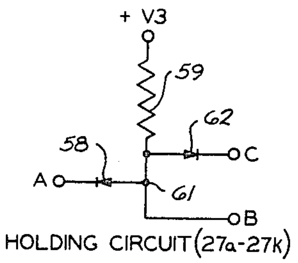
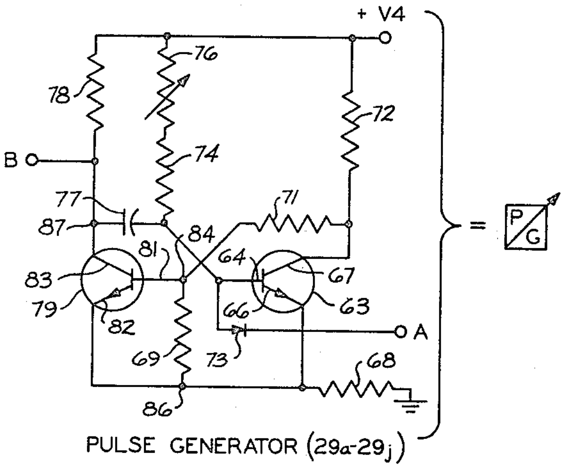
FIG. 4 FIG. 5

June 11, 1968 D. L. WIGGINS 3,387,775

CONVERTER FOR TAPE PERFORATOR

Filed July 7, 1965 5 Sheets-Sheet 3

PICK-UP AMPLIFIER 31

RESET GATE 41

RESPONSE GENERATOR 42a

DRIVER NO-GO CIRCUIT 43

RESPONSE GENERATOR 42b

June 11, 1968 D. L. WIGGINS 3,387,775

CONVERTER FOR TAPE PERFORATOR

Filed July 7, 1965 5 Sheets-Sheet 4

June 11, 1968 D. L. WIGGINS 3,387,775

CONVERTER FOR TAPE PERFORATOR

Filed July 7, 1965 5 Sheets-Sheet 5

United States Patent Office 3,387,775

Patented June 11, 1968

3,387,775

CONVERTER FOR TAPE PERFORATOR

David L. Wiggins, Franklin County, Ohio, assignor to Western Electric Company, Incorporated, New York, N.Y., a corporation of New York Filed July 7, 1965, Ser. No. 470,112
35 Claims. (Cl. 234—20)

ABSTRACT OF THE DISCLOSURE

An interface electrical circuit is connected between a data processing system and a tape perforator for holding potential levels, appearing on output terminals of the data processing unit in the form of coded intelligence, for a period sufficient to permit the tape perforator to reach an intelligence receptive mood and to punch a tape in accordance with the coded intelligence while passing through this mood. The interface circuit also includes release facilities for releasing the held potential levels after the punching operation and to indicate to the data processing system that the tape perforator is available for the reception of additional coded intelligence for the next punching operation.

*Field of the invention*

This invention relates to a converter for a tape perforator and particularly relates to a circuit for converting signals from a signal producing system to control a tape perforator.

*Background of the invention*

Programmed data producing systems, such as the IBM 1620 data processing system developed by the International Business Machines Corporation of New York, N.Y., are frequently utilized to provide programmed control of a tape perforator for transferring programmed information to a punched tape. In order to gain the advantage of high speed operation of the data processing system, it is advantageous to use high speed tape perforators, such as the Teletype Model BRPE high speed tape perforator developed by the Teletype Corporation of Skokie, Ill., where the tape perforator is an output device for the data processing system. However, since the tape perforator and the data processing system are operating at different speeds, timing problems occur between the time of perforation by the perforator and the output of the control signals from the processing system. In addition, the tape perforator is free-running and is not provided with a system of direct control, therefore, the tape perforator must be the controlling device during the perforation procedure.

*Summary of the invention*

It is, therefore, an object of this invention to provide a circuit for controlling the transmission of intelligence from a signal producing system for operating a tape perforator in timed response to controlling signals from a signal producing system.

Another object of this invention is the provision of a circuit responsive to the operation of the tape perforator controlled by a signal producing system for instructing the signal producing system of the completion of a tape perforating operation in preparation for additional intelligence for a subsequent tape perforating procedure.

With these and other objects in view, the present invention contemplates a circuit for transferring programmed intelligence from a signal producing system to a tape perforator and, further, for presenting the intelligence to the tape perforator when the perforator is mechanically in a position to accept signals. In addition, the circuit provides a response signal to the signal producing system to indicate the completion of a time period necessary to effect a punching operation, whereafter additional data is transferred through the circuit for a subsequent punching operation.

Other objects and advantages of the invention will become apparent upon consideration of the following detailed description in conjunction with the accompanying drawings.

*Brief description of the drawing*

FIG. 2 is a schematic of a typical NAND logic gate utilized in the converter circuit and also shows a symbol representing the gate;

FIG. 3 is a block diagram showing a combination of NAND logic gates connected as a "flip-flop" and, further, shows a symbol for the "flip-flop";

FIG. 4 is a schematic of a typical holding circuit used in the converter circuit for holding intelligence signals in an active state during a punching procedure;

FIG. 5 is a schematic of a monostable multivibrator which is utilized as a pulse generator in the converter circuit;

FIG. 6 is a schematic of a power amplifier for amplifying a generated pulse which controls operation of punch pin electromagnets of the tape perforator;

*General block diagram*

Figure 1:
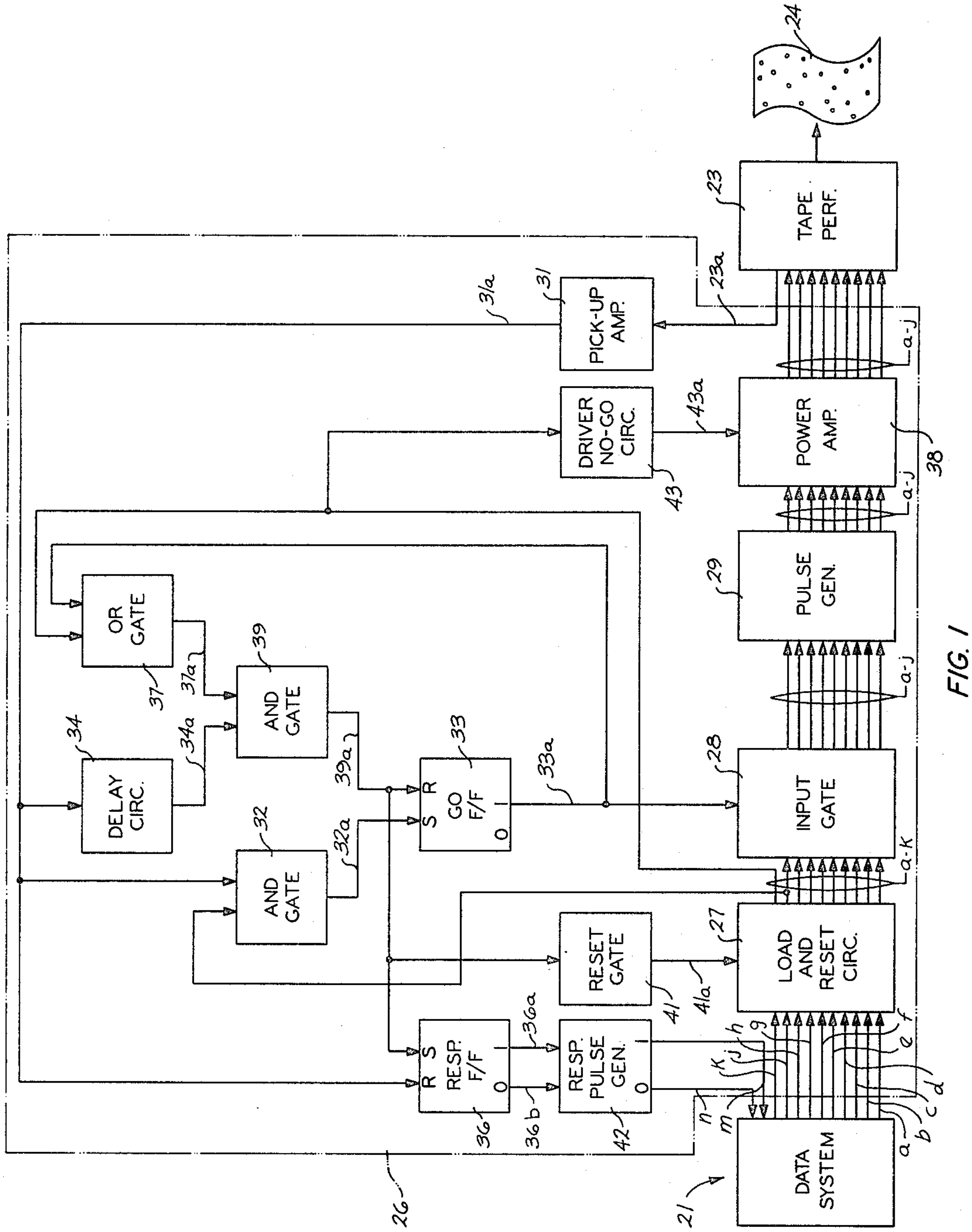
FIG. 1 is a block diagram showing generally the individual circuits of a converter circuit for transmitting coded intelligence from a data processing system to a tape perforator in accordance with the principles of the invention.

Referring now to FIG. 1, a data processing system, designated generally by the reference numeral 21, such as the IBM 1620 data processing system developed by the International Business Machines Corporation of New York, N.Y., is designed for producing periodic data signals in response to programmed information fed into the data system. The data system 21 is provided with a plurality of data output lines *a* through *h*, and also feed and no-feed lines *j* and *k*, respectively, for indicating a feed or no-feed condition on the data output lines *a* through *h*. For the purposes of description, data will appear on the data, feed and no-feed lines *a* through *k* in a low state, that is, a ground potential, or a high state, that is, a positive potential. It is noted the the letter *i* is not used. Therefore, when reference is made to data and feed lines *a* through *j* and also to associated circuits, it is to be understood that the letter *i* is not included. In some instances, the low state or ground level of a circuit will be referred to as the "0" state and the high state or positive potential level of a circuit will be referred to as the "1" state. In addition to the previously discussed data, feed and no-feed lines *a* through *k*, a pair of response control lines *m* and *n* provide controlling inputs to the data system 21.

Referring further to FIG. 1, the data processing system 21 is used to control a tape perforator 23 for punching coded character combinations in a tape 24 in accordance with transmitted intelligence from the data system. Initially, if data is to be fed from the system 21 to the tape perforator 23 for initiating a punching operation, a ground or a positive potential will appear on one or more of the data and feed lines *a* through *j* where the presence of ground on a data line indicates a punching condition and the presence of the positive potential on a data line indicates a non-punching or spacing condition.

The tape perforator 23 is a high speed perforator such as the Teletype Model BRPE, manufactured by the Teletype Corp. of Skokie, Ill., and includes a continuously rotating punch which rotates at a rate of approximately 110 revolutions per second. The tape perforator 23 further includes eight electromagnets for controlling punches for eight hole positions of the tape character in a tape 24 and one electromagnet for controlling a tape feeding mechanism. A flywheel of a drive mechanism for the perforator 23 is provided with a magnetic slug which activates a magnetic pickup upon each revolution of the drive mechanism to produce a clock pulse, thereby indicating the rotational position of the drive mechanism.

In order to use the data from the data system 21 to operate the tape perforator 23, the data, which is in the form of ground and positive potentials, must be developed into signals required to operate the tape perforator and, further, must be applied to the tape perforator during a given interval, dependent upon the rotational position of the perforator drive mechanism. To facilitate the transmitting of the intelligence from the data system 21 to the tape perforator 23 as called for by the perforator, a converter 26 includes circuits which respond to the ground potential on the data, feed and no-feed lines *a* through *k* and develop signals for operating the individual electromagnets of the tape perforator. In addition, the converter 26 is responsive to the rotational position of the perforator drive mechanism and insures the application of the perforator control signals to the perforator 23 during the proper interval. Further, the converter 26 is responsive to the completion of a punching operation and controls the data system 21 to provide the next bit of intelligence for a subsequent punching operation. The ground which appears on the feed line *j* provides an indication to the converter 26 that the data system is providing information for effecting a punching operation.

The data processing system 21 is provided with an output unit which includes silicon controlled rectifier circuits for providing the coded ground combination outputs on the data feed lines *a* through *j*. To insure the presence of the coded ground combination during an entire punching cycle, a current must be developed and sustained through the silicon controlled rectifiers during the punching cycle. To develop the necessary holding current for the silicon controlled rectifiers, a load and reset circuit 27, which forms a portion of the converter 26, responds to the presence of ground on one or more of the data and feed lines *a* through *j* of the data system 21 and holds the existing coded ground combination as transmitted from the data system until the converter 26 instructs the load and reset circuit that the punching operation has been effected.

The load and reset circuit 27 does not respond to the presence of a positive potential on the data and feed lines *a* through *j*. Hence, only those data lines which are at a low level or "0" state provide the necessary data for effecting a punching operation. The remaining data lines which are at a high level or "1" state do not transmit any signals to the tape perforator 23, thereby indicating a spacing on the tape 24.

The locked, ground level signals are fed through the load and reset circuit 27 to an input gate 28 on the data and feed lines *a* through *j*. In addition, an output line from the circuit 27 is provided for a no-feed signal which precludes the transmission of any data to the perforator 23 in accordance with the programmed data of the system 21 or in response to a self-detected error in the data system. The input gate 28, which is included within the converter 26, receives the locked, coded ground combination from the load and reset circuit 27. However, the gate 28 is designed to preclude the feeding of the coded combination to a pulse generator 29 over data and feed lines *a* through *j* unless the tape perforator driving mechanism is in a rotational position to properly receive the intelligence transmitted from the data system 21.

To insure that the input gate 28 releases the coded combination to trigger the pulse generator 29 at the proper interval, the magnetic pickup of the tape perforator 23 develops the clock pulse in response to the magnet on the perforator flywheel. The developed pickup pulse is then fed over a perforator output line 23*a* to a pickup amplifier 31 which is included within the converter 26. The pickup amplifier 31 amplifies the developed signal, whereafter the signal is fed over an output line 31*a* to three separate circuits, including an AND gate 32, a DELAY circuit 34 and a RESPONSE "flip-flop" 36. In addition to the application of the pickup signal to the AND gate 32, an input to the gate is also coupled from the output feed line *j* of the load and reset circuit 27 where the two coincident input signals enable the gate to produce an output signal.

The output signal of the AND gate 32 is fed over a line 32*a* to a GO "flip-flop" 33 and sets the "flip-flop" to a high or "1" state to develop an output signal. The output of the GO "flip-flop" 33 is fed over a line 33*a* to the input gate 28 and enables the input gate to feed the transmitted, coded combination to the pulse generator 29. Hence, the converter 26 precludes the transmitting of the intelligence to the tape perforator 23 until the driving mechanism of the perforator is in a proper rotational position to receive the intelligence. Further, the converter 26 precludes the development of an input gate enabling pulse unless there is a low level signal on the feed line *j* from the output of the load and reset circuit 27 to indicate the presence of data to be transmitted to the perforator 23.

The pickup signal, which is developed in the tape perforator 23, is fed to the pickup amplifier 31 and thereafter to the AND gate 32 as previously discussed. In addition, the signal is fed to the DELAY circuit 34 and to the RESPONSE "flip-flop" 36. The DELAY circuit 34 is designed to delay development of an output signal for a period of time coincident with the time required to effect a punching cycle. The RESPONSE "flip-flop" 36 is designed to provide an output only when the punching cycle has been completed. Hence, the pickup signal is fed to the RESPONSE "flip-flop" 36 to reset the "flip-flop" to a low level or "0" state which prepares the response pulse generator 42 to generate the response signals to the data system 21 after the start of the punching cycle is completed.

In addition to the feeding of the output signal from the GO "flip-flop" 33 to the input gate 28, the signal is also fed to an OR gate 37 which develops, during the punching cycle, a pulse indicative of the enabling of the input gate 28 and, further, that the intelligence transmitted from the data system 21 is being fed to the tape perforator 23.

The pulse generator 29 responds to the coded combination and develops defined pulses necessary for operating the electromagnets of the tape perforator 23. The output pulses of the pulse generator 29 are fed to a power amplifier stage 38 over data and feed lines *a* through *j*. The generated pulses are amplified in the power amplifier 38 to develop sufficient current to operate the punch electromagnets and are thereafter fed to the tape perforator 23 over data and feed lines *a* through *j*. In response to the transmitted intelligence of the coded combination, one or trolled rectifiers of the grounded data lines emanating from the output unit of the data system 21. The reduced current through the silicon controlled rectifiers is insufficient to sustain the rectifiers and the ground associated with each rectifier is thereby released from the load and reset circuit 27.

In the event the data system 21 provides a code on a given line which is high, that is, the positive potential, the respective holding circuit shown in FIG. 3 will not develop a holding current through the holding circuit previously described. Since the biasing between the positive potential V3 and the high level of the respective data from the data system 21 is insufficient to break down the diode 58, the output at terminal B will be high in terms of the positive potential V3.

The pulse generator 29 of the converter 26 includes nine monostable multivibrators 29*a* through 29*j* such as the multivibrator shown in FIG. 5. The multivibrator is designed to receive a low input at terminal A and to produce a negative going pulse at the output terminal B. A first NPN type transistor 63 of the multivibrator includes a base 64, an emitter 66 and a collector 67. The emitter 66 is connected through a resistor 68 to ground. In addition, the resistor 68 and resistors 69, 71 and 72 are connected between ground and a positive potential V4. In addition, the collector 67 is connected through the resistor 72 to the positive potential V4. The base 64 of the transistor 63 is connected to the input terminal A through a diode 73. The base 64 is connected to one side of a shunt circuit which includes a resistor 74 connected in series with a variable resistor 76 and this series combination connected in shunt with a series combination of a capacitor 77 and a resistor 78. The opposite side of the shunt combination is connected to the positive potential V4.

A second NPN type transistor 79 of the multivibrator includes a base 81, an emitter 82 and a collector 83. The base 81 of the transistor 79 is connected to a juncture 84 between the resistors 69 and 71. The emitter 82 of the transistor 79 is connected to ground through the resistor 68 at a juncture 86 between the resistors 68 and 69. The collector 83 of the transistor 79 is connected to a juncture 87 between the capacitor 77 and the resistor 78 and is also connected to the output terminal B.

In operation, a biasing circuit for the transistor 63 includes the positive potential V4, the resistors 68, 69, 71 and 72 and ground, whereby biasing potentials are developed on the emitter 66 and the collector 67. In addition, the biasing circuit includes the positive potential V4, the resistors 74 and 76, the base-emitter of the transistor 63, the resistor 68 and ground. A slight current flow through the base-emitter of the transistor 63 develops sufficient base-emitter bias to drive the transistor 62 into a level of conduction where the collector current is in saturation. During the buildup of the biasing on the base 64, the capacitor 77 is charged through the resistor 78 being positive on the left.

As the transistor 63 conducts, a biasing potential develops on the collector 67 which is coupled to the base 81 of the transistor 79 and is sufficient to maintain the transistor 79 in the nonconductive state. When the monostable multivibrator is in the state as described, the output at terminal B is high to the level of the positive potential V4.

The input gate 28 includes nine NAND input gates 28*a* through 28*j* (FIG. 2) each being designed to provide a low output on each of the respective data and feed lines *a* through *j* which are at ground at the output unit of the data system 21 and, further, to provide a high output on the respective data and feed lines which are high at the data system output unit. Therefore, any input on terminal A of the multivibrator (FIG. 5) which is low will bias the base 64 of the transistor 63 so that the transistor is rendered nonconductive. At this time, the potential on the collector 67 of the transistor 63 biases the base 81 of the transistor 79 so that the transistor 79 is rendered conductive. During this period the capacitor 77 discharges through the resistors 74 and 76 to a potential level which biases the base 64 of the transistor 63 to render the transistor conductive. Thereafter, the collector potential of the transistor 63 biases the transistor 79 into a nonconductive state. During the period when the transistor 79 was conductive, a negative going pulse appeared on the output terminal B with the pulse width being determined by the discharge time of the capacitor 77 to a potential level sufficient to bias the transistor 63 into conduction.

Since the electromagnets of the tape perforator 23 are difficult to adjust with respect to armature clearance spring tensions and individual magnet inductance and resistance, it is desirable to control the pulse width of each individual generated pulse rather than adjust each magnet circuit of the perforator to respond to a standard pulse width. Therefore, the resistor 76 is variable to control the discharge time of the capacitor 77, thereby controlling the width of the developed pulses appearing at the respective output terminals B of the pulse generators 29*a*–29*j*.

As previously discussed, if the data and feed lines *a* through *j* are high at the data system output unit, the outputs of the respective NAND input gates 28*a*–28*j* are also high. Hence, the inputs to terminals A of the associated pulse generators 29*a*–29*j* are high. A high on the base 64 of the transistor 63 does not switch the state of operation so the output terminal B remains high at the level of the positive potential V4. Therefore, the output of the multivibrator as shown in FIG. 5 is either high or is a negative going pulse having a variably-controlled pulse width determined, primarily, by the timing circuit of the capacitor 77 and the variable resistor 76.

The pulse generators 29*a*–29*j* are represented by the symbol as shown to the right in FIG. 5.

The punching electromagnets of the tape perforator 23 require more current than is produced by the pulse generator 29, therefore, the power amplifier stage 38 must be provided to generate the necessary current for operating punch magnets in response to the generated pulses fed from the pulse generator 29. The power amplifier stage 38 includes nine amplifier circuits 38*a* through 38*j*, as shown in FIG. 6, for developing sufficient power to operate the punch electromagnets. It is noted that the power amplifier circuit, as shown in FIG. 6, resembles the NAND logic gate, as shown in FIG. 2. However, different circuit parameters are required to produce the necessary power to operate the punch magnets.

Each of the amplifier circuits 38*a*–38*j*, as shown in FIG. 6, includes an NPN type transistor 88 having a base 89, an emitter 91 and a collector 92. The emitter 91 of the transistor 88 is connected to ground and is also connected to the base 89 through a resistor 93. In addition, the base 89 is connected to a positive potential V5 through a diode 94 and a resistor 96. A pair of input terminals A and B are connected respectively through diodes 97 and 98 and commonly through the resistor 96 to the positive potential V5. The collector 92 is connected to an output terminal C which is further connected to a positive potential V6 through a punch electromagnet coil 99 shown in phantom. The operation of the amplifier circuit is similar to the operation of the NAND logic gate, shown in FIG. 2, where the electromagnet coil 99 replaces the collector resistor 56 of the NAND gate.

As shown in FIG. 6, the transistor 88 of each of the power amplifiers 38*a*–38*j* must conduct to couple ground to the output terminal C and, therefore, provide the operating circuit for the punch electromagnet coil 99. In the discussion of the NAND logic gate, as shown in FIG. 2, it was observed that both inputs on terminals A and B would have to be high in order to drive the transistor 52 into conduction. The same condition exmore of the eight tape perforator electromagnets are operated to punch the coded combination of tape characters in the tape 24. The tape feed mechanism responds to the developed pulse on the feed line *j* and steps the tape 24 to the next position subsequent to the actual punching.

In response to the output signal of the GO "flip-flop" 33, the OR gate 37 develops a signal which is fed to an AND gate 39 over a line 37*a*. After a predetermined period has lapsed subsequent to the development of the pickup signal, the DELAY circuit 34 develops an output signal which is fed to the AND gate 39 over line 34*a*. It is noted that the time interval between the feeding of the pickup signal to the DELAY circuit 34 and the subsequent development of an output signal from the DELAY circuit by, and is coincident with, the time required to transmit the intelligence from the coded combination at the input gate 28 to the tape perforator 23 and to further complete the punching cycle. As the signal is developed in the DELAY circuit 34, the DELAY circuit signal and the developed signal of the OR gate 37 are coincidentally fed to the input of the AND gate 39 and enables the gate to develop a signal at an AND gate output.

The developed signal of the AND gate 39 is fed to the GO "flip-flop" 33 over a line 39*a* and resets the state of the "flip-flop" to a "0" level whereby no output signal appears on the line 33*a*. Thus, the input gate 28 is again disenabled to preclude the feeding of the transmitted coded combination from the input gate to the pulse generator 29.

In addition, the output of the AND gate 39 is fed to a reset gate 41 which develops a signal that is fed to the load and reset circuit 27 over a line 41*a*. The load and reset circuit 27 responds to the developed signal of the reset gate 41 and diverts the holding current from the data system 21, thereby releasing the coded ground combination transmitted from the data system and resetting the circuit 27 for a subsequent coded combination.

The output signal of the AND gate 39 is also fed to the RESPONSE "flip-flop" 36 to set the "flip-flop" to a "1" state. As the RESPONSE "flip-flop" 36 is set to the "1" state, signals are fed to a RESPONSE pulse generator 42 over lines 36*a* and 36*b*, whereby "1" and "0" level signals are developed and fed to the data system 21 on the input lines *m* and *n*, respectively, to inform the data system that the punching cycle has been completed. The data system 21 thereafter presents the next bit of intelligence for the next punching cycle.

In the event the data system 21 transmits erroneous coded characters, the errors are detected by the system and a code in the form of a ground on the no-feed line *k* is transmitted to the converter 26 and through the load and reset circuit 27 to the no-feed output line *k*. The no-feed signal is fed to a driver no-go amplifier 43 which develops an inhibiting signal fed to the power amplifier 38 over a line 43*a*, whereby the power amplifier is inhibited from operation, thereby precluding the transmission of the erroneous coded intelligence to the tape perforator 23.

To reset the converter 26 after the erroneous intelligence has been detected, the no-feed signal is also fed to the OR gate 37 to operate the AND gate 39 in coincidental combination with the developed signal of the DELAY circuit 34. In this manner, the converter 26 is conditioned for the transmission of the next bit of intelligence from the data system 21 by insuring that the GO "flip-flop" 33 is in the "0" state, by operating the reset gate 41 to reset the load and reset circuit 27 and to switch the RESPONSE "flip-flop" 36 to the "1" state, whereby the RESPONSE pulse generator 42 develops "0" and "1" level signals to instruct the data system 21 to provide the next subsequent bit of intelligence for effecting the next punching operation.

*Specific circuit description*

Some of the circuits of the converter 26 use a typical NAND logic gate, as shown in FIG. 2, which includes two input terminals A and B and an output terminal C and is designed to receive signals which are either high or low, that is, a signal having a positive potential or a signal at ground, respectively. As shown in FIG. 2, the input terminals A and B of the NAND gate are connected to a common juncture point 44 through a pair of diodes 46 and 47, respectively. The juncture point 44 is connected through a resistor 48 to a positive potential V1 and is further connected through a diode 49 to a base 51 of an NPN type transistor 52. An emitter 53 of the transistor 52 is connected to ground and a collector 54 of the transistor is connected to a positive potential V2 through a resistor 56 and is also connected to the output terminal C. In addition, a resistor 57 is connected between the base 51 and the emitter 53 of the transistor 52.

In the operation of the NAND logic gate, a base-emitter bias developing circuit includes the positive potential V1, the resistor 48, the diode 49, the resistor 57 and ground where a voltage developed across the resistor 57 normally biases the transistor 52 into a conductive state, whereby the output on the output or collector terminal C goes to ground. If either or both of the inputs at terminals A or B are low, a current flow results in a circuit which includes the positive potential V1, the resistor 48, the respective diode 46 or 47, or both, and the ground appearing on the respective input terminal A or B, or both. This condition changes the biasing circuit for the transistor 52 and the transistor is rendered nonconductive, whereby the output on terminal C goes high to the positive potential V2. Hence, the truth table for the NAND logic gate is as follows:

| Term A | Term B | Term C |
|---|---|---|
| Low | Low | High |
| High | Low | High |
| Low | High | High |
| High | High | Low |

Referring further to FIG. 2, the NAND logic gate is represented by the symbol shown to the right of the schematic.

As shown in FIG. 3, two NAND gates have been combined to provide a "flip-flop" having set and reset inputs with a "1" and "0" level outputs. The combined NAND gates which form a "flip-flop" are represented by the symbol, as shown to the right of FIG. 3.

The load and reset circuit 27 includes ten holding circuits 27*a* through 27*k* such as the holding circuit shown in FIG. 4 and are connected to the data, feed and no-feed lines *a* through *k*, respectively, for holding ground on the lines emanating through the silicon controlled rectifiers of the output unit of the data system 21. The data, feed and no-feed lines *a* through *k* are each connected to an input terminal A and through a diode 58 to an output terminal B. A positive potential V3 is connected through a resistor 59 to a juncture point 61 between the diode 58 and the output terminal B. Further, a reset input terminal C is connected to the juncture point 61 through a diode 62.

In operation, if a ground potential appears within the data system output unit on any of the data, feed or no-feed lines *a* through *k*, current flows in a circuit which includes the positive potential V3, the resistor 59, the diode 58, the silicon controlled rectifier of the respective system circuit and ground in the data system 21. The presence of this current is sufficient to hold the silicon controlled rectifiers, thereby maintaining ground on the respective data, feed or no-feed lines *a* through *k*. Hence, a ground appears at the output terminal B as long as the current flow remains. The output terminals B of each of the ten circuits, an example of which is shown in FIG. 4, are connected to the input gate 28 (FIG. 1).

Upon the completion of the punching operation, a negative going reset signal is fed from the reset gate 41 (FIG. 1) to each of the input terminals C of the holding circuits, shown in FIG. 4, whereby a portion of the holding current is diverted through the diode 62 and away from the holding circuit which includes the silicon conists in the power amplifier 38a–38j wherein the input on terminal A, which represents punching intelligence and the input on terminal B from the driver no-go circuit 43 must be high in order for the respective coil 99 to be energized. It is noted that the output of the driver no-go circuit 43 will only be high when the no-feed line k is high at the output unit of the data system 21. If the output of each of the pulse generators 29a–29j is a negative going pulse in terms of a low, this pulse must be inverted prior to being fed to the respective input terminals A of the power amplifiers 38a–38j in order for proper transmission of the coded intelligence.

The inverting stage between the pulse generators 29a–29j and the respective power amplifiers 38a–38j utilizes the NAND logic gate shown in FIG. 2. The inverting stage responds to an input of the negative going pulse fed from the respective outputs of the pulse generators 29a–29j and develops a high at the output of the inverter stage which is coupled to the respective input terminals A of the power amplifiers 38a–38j. Since the driver no-go output remains high during the proper transmission of coded intelligence, the transistor 88 conducts to connect the electromagnet coil 99 between the positive potential V6 and ground, whereby the coil is energized.

Figure 7:
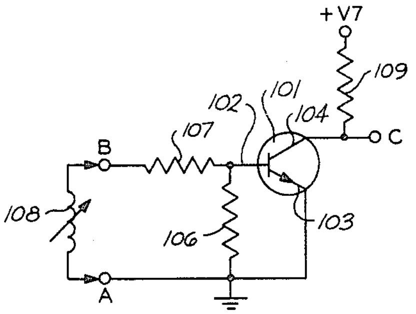
FIG. 7 is a schematic of an amplifier for amplifying a periodic clock signal from the tape perforator.

As shown in FIG. 7, the pickup amplifier 31 includes an NPN type transistor 101 having a base 102, an emitter 103 and a collector 104. The emitter 103 is connected to ground and is also connected to the base 102 and to a resistor 106. An input terminal A is connected to ground and the base 102 is connected to an input terminal B through a resistor 107. A tape perforator pickup coil 108 is connected across the input terminals A and B and develops the clock pulse as a result of the magnetic slug on the rotating flywheel of the perforator 23 continuously passing the pickup coil. The collector 104 of the transistor 101 is connected to an output terminal C and is also connected to a positive potential V7 through a resistor 109.

The pickup pulse developed across the input terminals A and B of the pickup amplifier 31 is a bipolar spike. During the positive half of the spike, sufficient base-emitter bias is developed to drive the transistor 101 into conduction, whereby the output at terminal C goes from a high to a low level, that is, from the positive potential V7 to ground. This condition remains steady until the pickup pulse goes into the negative half of the cycle whereafter the transistor C goes high. Thus, the amplified pickup pulse appearing at terminal C is a low level pulse, the duration of which is determined by the duration of the positive half cycle time of the bipolar spike.

Figure 8:
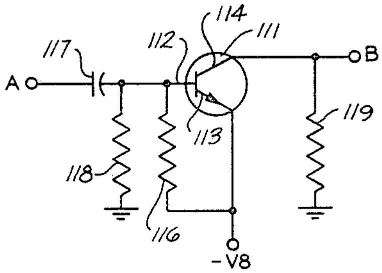
FIGS. 8 and 9 are schematics of response pulse generators utilized for producing signals responsive to the time necessary for the tape perforator to control the data processing system.
Figure 9:
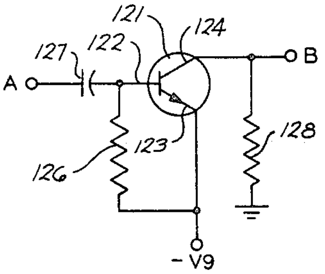

The RESPONSE pulse generator 42 includes two circuits 42a and 42b, as shown in FIGS. 8 and 9, respectively, for developing the high and low level signals required to notify the data system 21 of the completion of the punching operation. The pulse generating circuit 42a as shown in FIG. 8 includes an NPN type transistor 111, a base 112, an emitter 113 and a collector 114. The emitter 113 is connected to a negative potential V8 and is also connected to the base 112 through a resistor 116. The base 112 is connected to an input terminal A through a capacitor 117 and is also connected to ground through a resistor 118. The collector 114 is connected to an output terminal B and is also connected to ground through a resistor 119.

In operation, a base-emitter biasing network of the RESPONSE pulse generator circuit 42a, as shown in FIG. 8, includes the negative potential V8, the resistor 116, resistor 118 and ground. Since the collector 114 is connected to ground through the resistor 119, the transistor 111 is biased into conduction, whereby the negative potential V8 appears on the output terminal B.

As the RESPONSE "flip-flop" 36 is set, as previously discussed, the negative or "0" output is fed to the input terminal A of the pulse generator circuit 42a shown in FIG. 8. The negative input pulse is sufficient to bias the transistor 111 into nonconduction, whereby the output appearing on terminal B goes to ground. The combination of the capacitor 117 and the resistor 118 comprise a timing network which determines the length of the output pulse by controlling the time in which the transistor 111 remains in a nonconductive state.

As shown in FIG. 9, the other RESPONSE pulse generator circuit 42b includes an NPN type transistor 121 having a base 122, an emitter 123 and a collector 124. The emitter 123 is connected to a negative potential V9 and is also connected to the base 122 through a resistor 126. The base 122 is connected to an input terminal A through a capacitor 127. The collector 124 is connected to an output terminal B and is also connected to ground through a resistor 128.

Since the emitter 123 and the base 122 are theoretically biased at the negative potential V9, the transistor 123 is normally not conducting without the aid of other bias potential, therefore, the output appearing on terminal B will be at ground.

When the RESPONSE "flip-flop" 36 provides a "1" output, the output is coupled to the input terminal A of the pulse generator circuit 42b, as shown in FIG. 9. Since the "1" level input is a positive pulse, the base 122 is biased sufficiently to trigger the transistor 121 into conduction, whereby the negative potential V9 appears on the output terminal B. Hence, the output of the pulse generator 42b, as shown in FIG. 9, appears as a negative pulse between ground and the negative potential V9. The length of the output pulse is determined by a timing network which includes the capacitor 127 and a resistor within the RESPONSE "flip-flop" 36 such as the collector resistor 56, as shown in FIG. 2.

It is noted that the RESPONSE "flip-flop" 36 and the pulse generator circuits 42a and 42b, as shown in FIGS. 8 and 9, respectively, have been designed to produce specific control pulses for the data system 21 in response to the completion of the time necessary for a punching operation. Other circuits could be designed to provide controlling pulses for data systems other than the type used as data system 21 without departing from the concept of the present invention.

As previously discussed, a negative potential pulse is required to reduce the holding currents of the load and reset circuit 27 and specifically of the holding current of the respective circuits 27a–27j, as shown in FIG. 4, in order to reset the output unit of the data system 21.

Figure 10:
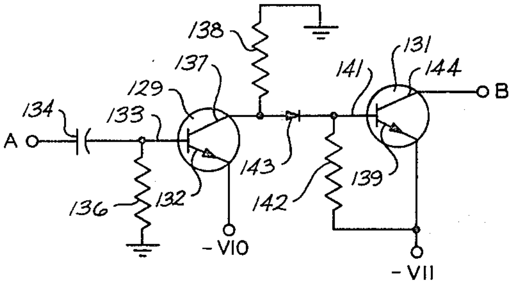
FIG. 10 is a schematic of a gating circuit which responds to the time necessary for completing the perforating operation for resetting output circuits of the data system in preparation for the transmission of subsequent signals from the data processing system.

The reset gate 41 develops the negative pulse to reduce the holding current and, as shown in FIG. 10, includes an NPN type driver transistor 129 and an NPN type, power amplifier transistor 131. The transistor 129 is provided with an emitter 132 which is connected to a negative potential V10. A base 133 of the transistor 129 is connected to an input terminal A through a capacitor 134 and is also connected to ground through a resistor 136. A collector 137 of the transistor 129 is connected to ground through a resistor 138. An emitter 139 of the transistor 131 is connected to a negative potential V11 and is also connected to a base 141 of the transistor through a resistor 142. The base 141 of the transistor 131 is connected through a diode 143 to the collector 137 of the transistor 129. A collector 144 of the transistor 131 is connected to an output terminal B.

Sufficient biasing for the transistor 129 is normally developed by current flow through the base-emitter of the transistor to render the transistor conductive, whereby the negative potential V10 appears on the collector 137. The presence of the negative potential V10 on the collector 137 biases the power amplifier transistor 131 into nonconduction, whereby no output potential appears on the terminal B. As a negative output pulse is fed from the AND gate 39 to the reset gate 41 in response to the time required for the punching operation, the base 133 of the transistor 129 is biased sufficiently to render the transistor nonconductive. Thereafter, the base-emitter biasing network for the transistor 131, which includes the negative potential V11, the resistor 142, the diode 143, the resistor 138 and ground, develops sufficient bias to render the transistor 131 conductive, whereby the negative potential V11 appears on the output terminal B. The transistor 131 is a high power, NPN type transistor which draws a considerable portion of the current from the holding circuits *27a–27j* through the diode 62, as shown in FIG. 4. This procedure diverts the necessary holding current from the output unit of the data system 21, whereby the output unit is reset in view of the absence of the necessary holding current.

As previously discussed, in the event erroneous data is fed from the data system 21 to the converter 26, the data system will detect internally the feeding of the erroneous intelligence and will restrict the transmission of the error intelligence by placing a low or ground on the no-feed line *k* at the output unit of the data system 21. This low signal is fed through the converter 26 to the driver no-go circuit 43, whereby a low level signal is developed and fed to one of the inputs of the power amplifiers *38a–38j*, as shown in FIG. 6, to inhibit operation of the amplifiers, thereby preventing the transmission of the erroneous coded intelligence to the tape perforator 23.

Figure 11:
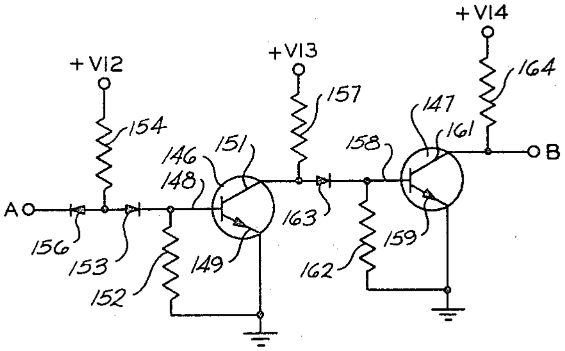
FIG. 11 is a schematic of an amplifier and a driver for the amplifier for producing a signal to inhibit operation of the tape perforators when an error is detected in intelligence transmitted by the data processing system.

The driver no-go circuit 43, as shown in FIG. 11, includes a driver transistor 146 and a power amplifier transistor 147 where both transistors are the NPN type. The transistor 146 is provided with a base 148, an emitter 149 and a collector 151. The emitter 149 is connected to ground and is also connected to the base 148 through a resistor 152. Further, the base 148 is connected to a positive potential V12 through a diode 153 and a resistor 154. The output terminal B of the holding circuit *27k* (FIG. 4) is connected to a driver no-go input terminal A which is connected, within the driver no-go circuit 43, to the positive potential V12 through a diode 156 and the resistor 154. The collector 151 of the transistor 146 is connected to a positive potential V12 through a resistor 157. The transistor 147 is provided with a base 158, an emitter 159 and a collector 161. The emitter 159 is connected to ground and is also connected to the base 158 through a resistor 162. The base 158 is connected to the collector 151 of the transistor 146 through a diode 163. The collector 161 of the transistor 147 is connected to a positive potential V14 through a resistor 164 and is also connected to an output terminal B which is connected to the respective input terminals B of the power amplifiers *38a–38j*, as shown in FIG. 6.

If no erroneous intelligence has been transmitted to the converter 26, the input at the driver no-go terminal A from the no-feed line *k* is high, therefore, a base-emitter bias circuit, including the positive potential V12, the resistor 154, the diode 153, the resistor 152 and ground, develops sufficient bias between the base and the emitter to render the transistor conductive in view of the positive potential appearing initially on the collector 151. As the transistor 146 conducts, ground appears on the collector 151, thereby developing a bias which prevents the breakdown of the diode 163. Since the base 158 and the emitter 159 are theoretically at ground, the transistor 147 will not conduct and, therefore, the output of the driver no-go circuit 43 at terminal B is high in the order of the positive potential V14. Since the output terminal B of the driver no-go circuit 43 is high, the input terminals B of the power amplifiers *38a–38j*, as shown in FIG. 6 is also high and this condition has no effect upon the operation of the power amplifier as previously discussed. Therefore, any controlling input on the terminals A of the power amplifiers *38a–38j*, as shown in FIG. 6, will determine the state of the power amplifier output at terminal C of the respective power amplifiers and will determine the operation of the associated electromagnet coil 99 (FIG. 6).

In the event erroneous intelligence is transmitted from the data system 21 to the converter 26, the data system detects the transmission of the error and develops a low level, or ground, on the no-feed line *k* of the data system output unit which is transmitted to the input terminal A of the driver no-go circuit 43, as shown in FIG. 11. The presence of ground on the input terminal A of the driver no-go circuit 43 develops a bias which prevents further breakdown of the diode 153, thereby placing the base 148 and the emitter 149 at ground, whereby the transistor 146 is rendered nonconductive. The collector 151 of the transistor 146 then goes to the positive potential V13, whereafter the diode 163 breaks down to develop sufficient bias between the base 158 and the emitter 159 to render the transistor 147 conductive.

As the transistor 147 conducts, the collector 161 and the driver no-go output terminal B go to ground. The low output at terminal B of the driver no-go circuit 43, as shown in FIG. 11, is then fed to the input terminals B of the power amplifiers *38a–38j*, as shown in FIG. 6. Since a low appears at the input terminals B of the power amplifiers *38a–38j*, the transistor 88 of the individual amplifiers is rendered nonconductive regardless of the condition of the input at terminal A of the amplifier circuit. Therefore, the erroneous data which would appear at the input terminals A of the power amplifiers *38a–38j* has no effect upon the operation of the individual circuits and the associated punch magnet coils 99 are not operated.

*Detailed block diagram*

Figure 12:
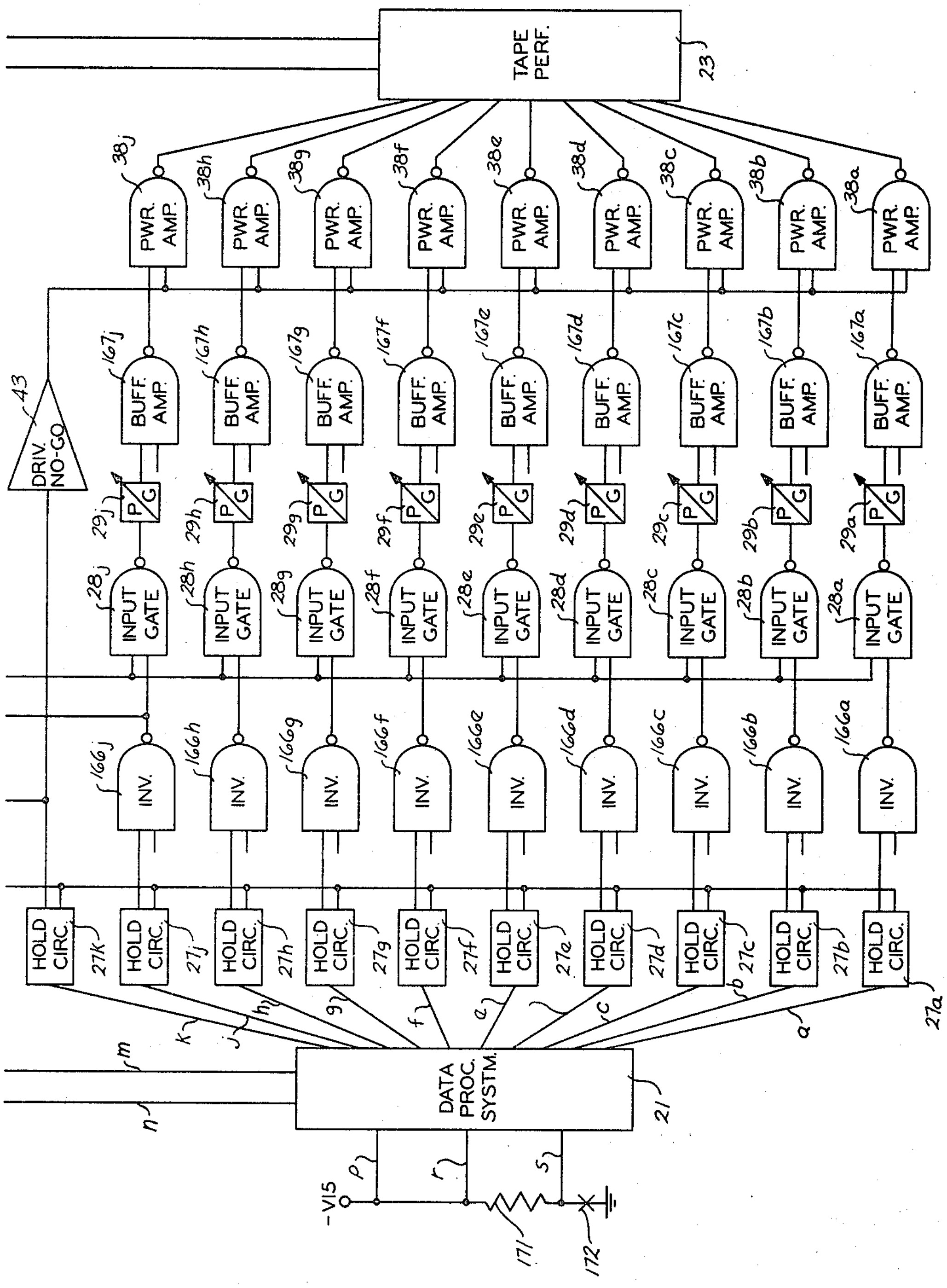
FIGS. 12 and 13 combine to show a specific block diagram of the converter circuit in accordance with the principles of the invention.
Figures 13, 14:
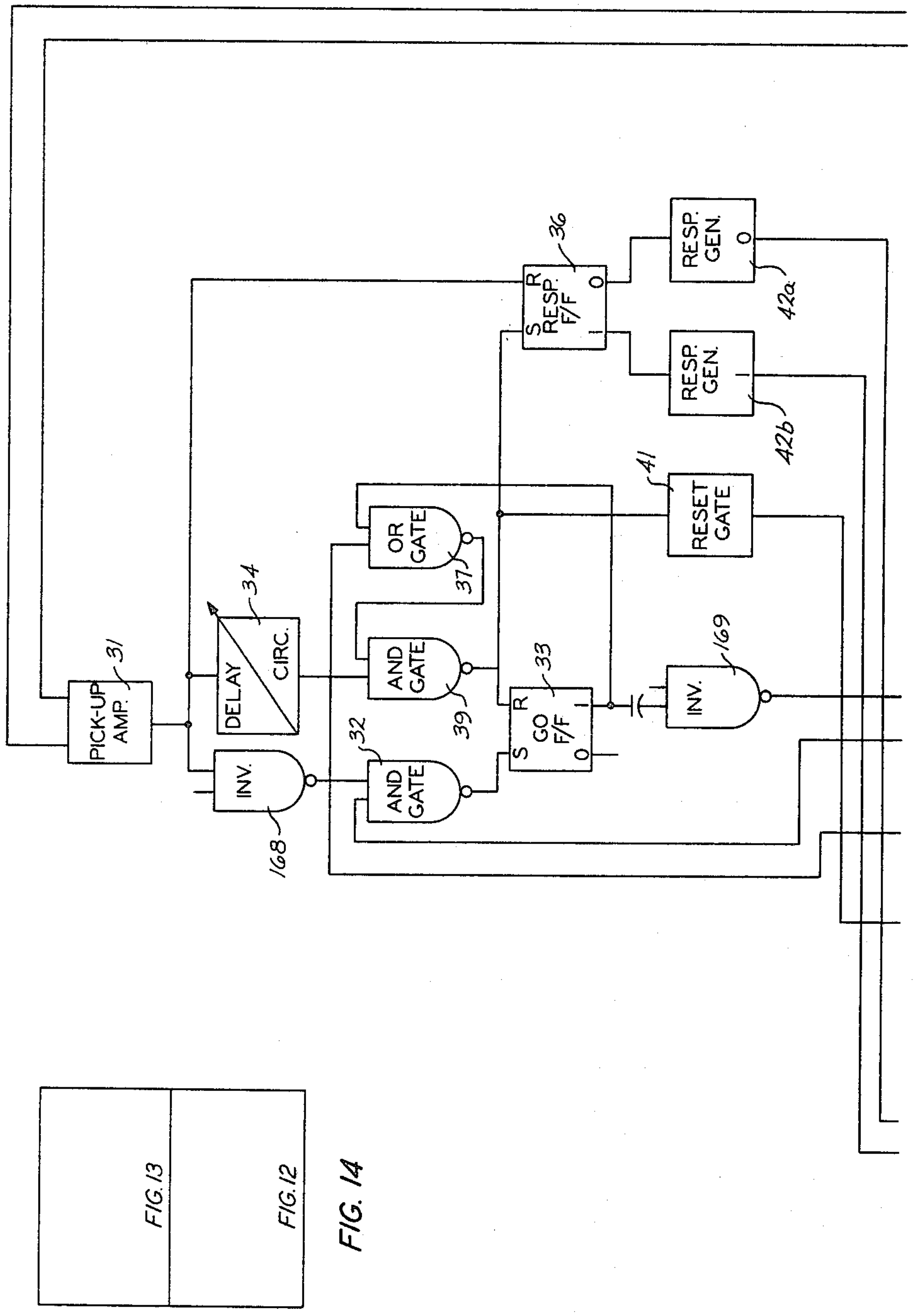
FIG. 14 is a view showing a figure arrangement of FIGS. 12 and 13 to show a complete circuit configuration of the specific block diagram of the converter circuit show in FIGS. 12 and 13.

A detailed block diagram of the system, which includes the converter 26 for transmitting intelligence from the data system 21 to the tape perforator 23, is shown in FIGS. 12 and 13. An arrangement of FIGS. 12 and 13 for showing the combined specific block diagram is shown in FIG. 14.

The ten output lines *a* through *k* emanating from the output unit of the data processing system 21 are connected to the ten individual input terminals A of the ten individual holding circuits *27a–27k* (FIG. 4) which form the load and reset circuit 27 (FIG. 1). The output terminals B of the holding circuits *27a–27j* (FIG. 4) are connected through respective data and feed lines *a* through *k* to one of a pair of input terminals of inverters *166a* through *166j*, respectively. The output terminal B of the holding circuit *27k* is connected through the no-feed line *k* to the input terminal A of the driver no-go circuit 43 (FIG. 11).

The inverters 166 are identical to the NAND logic gate shown in FIG. 2, and utilize only one of the input terminals A and B. The output terminals C of the inverters *166a–166j* are connected to the input terminals B of the NAND logic input gates *28a–28j* (FIG. 2), respectively, which form the input gate 28 (FIG. 1).

The output terminals C of the NAND logic input gates *28a–28j* are connected over data and feed lines *a* through *j* to the input terminals A of the respective pulse generators *29a–29j* (FIG. 5) which form the pulse generator 29 (FIG. 1). The output terminals B of the pulse generators *29a–29j* are connected to one of a pair of input terminals of buffer amplifiers *167a* through *167j*, respectively. It is noted that the buffer amplifiers *167a–167j* have the same circuit configuration as the NAND logic gate shown in FIG. 2.

The output terminals of the buffer amplifiers *167a–167j* are connected respectively to the terminals A of the power amplifiers *38a–38j* (FIG. 6), respectively, which form the power amplifier 38 (FIG. 1). The output terminals C of the power amplifiers *38a–38h* are connected to the respective punch coils 99 (FIG. 6) which are contained within the tape perforator 23. In addition, the output terminal C of the power amplifier *38j* is connected to the tape feed mechanism within the tape perforator 23.

The pickup coil 108 (FIG. 7), which is positioned within the tape perforator 23 shown in FIG. 12, is connected to the input terminals A and B of the pickup amplifier 31 (FIG. 7) as shown in FIGS. 12 and 13. Referring to FIG. 13, the output terminal C of the pickup amplifier 31 is connected to the reset input of the RESPONSE "flip-flop" 36, the input terminal of the DELAY network 34 and one of two inputs of an inverter circuit 168 which is identical to the NAND logic gate shown in FIG. 2. The remaining input of the inverter circuit 168 is open. It is noted that the RESPONSE "flip-flop" 36 is identical to the "flip-flop" shown in FIG. 3.

The output terminals of the inverter 168 are connected to one of the input terminals of the AND gate 32 which substantially resembles the circuit configuration of the NAND logic gate shown in FIG. 2. The other input of the AND gate 32 is connected to the output terminal of the feed signal inverter 166*j* (FIG. 12). The output terminal of the AND gate 32 is connected to the set input of the GO "flip-flop" 33. It is noted that the GO "flip-flop" 33 is identical to the "flip-flop" shown in FIG. 3.

The "1" output of the GO "flip-flop" 33 is connected to one input terminal of an inverter 169 which is identical to the NAND logic gate shown in FIG. 2. The remaining input terminal of the inverter 169 is open and the inverter output terminal is connected to the input terminals A of the NAND logic gates 28*a*–28*j*, as shown in FIG. 12.

The output terminal B of the holding circuit 27*k* (FIG. 4) connects the no-feed line *k* to one of two input terminals of the OR gate 37. It is noted that the OR gate 37 is similar to the NAND logic gate, shown in FIG. 2, but is designed to provide an output in response to an input on either of two input terminals. The "1" output terminal of the GO "flip-flop" 33 is connected to the other input terminal of the OR gate 37.

The output terminal of the OR gate 37 is connected to one of two input terminals of the AND gate 39. It is noted that the AND gate 39 resembles the NAND logic gate, shown in FIG. 2, but is designed to produce an output in response to the application of two coincidental signals on the two input terminals of the gate. The output terminal of the DELAY circuit 34 is connected to the other input terminal of the AND gate 39.

The output terminal of the AND gate 39 is connected to the reset input of the GO "flip-flop" 33, the set input of the RESPONSE "flip-flop" 36 and the input terminal A of the reset gate 41.

The output terminal B of the reset gate 41 (FIG. 10) is connected to the input terminals C of the holding circuits 27*a*–27*k* (FIG. 4).

The "0" output of the RESPONSE "flip-flop" 36 is connected to the input terminal A of the RESPONSE generator circuit 42*a* (FIG. 8) and the "1" output of the RESPONSE "flip-flop" is connected to the input terminal A of the RESPONSE generator circuit 42*b* (FIG. 9). The output terminal B of the RESPONSE generator circuits 42*a* and 42*b* are connected to the data system 21.

The output terminal B of the holding circuit 47*k* (FIG. 4) is also connected to the input terminal A of the driver no-go circuit 43 (FIG. 11). The output terminal B of the driver no-go circuit 43 is connected to the input terminals B of the power amplifiers 38*a*–38*j* (FIG. 6).

*Operation*

Initially, coded intelligence appears at the data system output in the form of high and low outputs on the data and feed lines *a* through *j*. The combinations of high and low outputs on the data lines *a* through *j* will be determined by the programmed instructions to the data system 21 and are generally in accordance with changes in the information necessary for numerous punching cycles. For the purposes of description, it will be assumed that only data line *a* and feed line *j* are low and the remaining data lines *b* through *h* and the no-feed line *k* are high. It is noted that this combination provides coded intelligence for the tape perforator 23 to operate the punch associated with the data line *a* and to thereafter advance the tape for the next succeeding punching procedure.

Referring to FIGS. 12 and 13, the low appearing on the data line *a* results in a current flow through the holding circuit 27*a* which establishes a holding current through the associated silicon controlled rectifiers within the output unit of the data system 21. The holding current is sufficient to hold the low on the data line *a* emanating from the data system 21. The low is thereafter fed through the holding circuit 27*a* and is inverted in the inverter 166*a* to develop a high at the input terminal of the NAND input gate 28*a*. The same procedure is effected through the holding circuit 27*j* and the inverter 166*j* in view of the low appearing on the feed line *j*. The high output of the inverter 166*j* is fed to one input of the NAND input gate 28*j* and is also fed to one input of the AND gate 32.

As a pickup pulse is developed in the tape perforator 23, a low appears at the output of the pickup amplifier 31 and is fed to the input of the inverter 168. A high appears on the output of the inverter 168 and is fed to the other input of the AND circuit 32. The coincidence of the two high inputs enable the AND gate 32, whereby a low appears on the AND gate output which is fed to the set input of the GO "flip-flop" 33 thereby setting the "flip-flop" to produce a "1" output.

The "1" output of the GO "flip-flop" 33 is low and is inverted by the inverter 169 to produce a high which is then fed to the input terminals A of the NAND input gates 28*a*–28*j*. Since the input terminals B of the NAND input gates 28*a* and 28*j* are both high, as previously discussed, the coincidence of two high inputs enables these gates and a low output appears on terminals C of the NAND input gates 28*a* and 28*j*.

The remaining NAND input gates 28*b*–28*h* each have a combination of a high and a low on the respective input terminals A and B, therefore, the gates are not enabled and the outputs of each of the NAND gates 28*b* through 28*h* is high.

The low outputs of the NAND input gates 28*a* and 28*j* are fed to the input terminals A of the pulse generators 29*a* and 29*j*, respectively, to develop a negative output pulse, or a low, on terminals B of the pulse generators, as previously discussed. Since the outputs of the remaining NAND input gates 28*b* through 28*h* are high, the associated pulse generators 29*b* through 29*h*, respectively, do not generate pulses. The outputs of the pulse generators 29*a* and 29*j* are negative going and have a pulse width which is determined by the timing circuit which includes, primarily, the capacitor 77 and the variable resistor 76, as shown in FIG. 5. As previously discussed, each timing circuit must be individually set to compensate for the unique characteristics of the respectively controlled electromagnet. The negative output pulse of each of the generators 29*a* and 29*j* are inverted in the buffer amplifiers 167*a* and 167*j*, respectively, to provide a high on the output of the buffer amplifiers.

The output of the buffer amplifiers 167*a*–167*k* are connected to the input terminals A of the power amplifiers 38*a* and 38*j*, respectively. As the input on the terminals A of the power amplifiers 38*a* and 38*j* goes high, sufficient base-emitter bias is developed for the transistor 88 to drive the transistor into conduction, whereby the output terminal of the power amplifiers 38*a* and 38*j* goes low, or to ground. As the output of the power amplifiers 38*a* and 38*j* goes low the punch coil 99 associated with the data feed line *a* is energized to operate the punch controlled by the coil. In this manner, the tape 24 (FIG. 1) is punched in accordance with the intelligence transmitted from the data system 21. In addition, the low output of the power amplifier 38*j* is coupled to the tape feed mechanism within the tape perforator for advancing the tape to the next position for a subsequent punching operation.

Since the inputs to the pulse generators 29*b* through 29*h* are high, the outputs of these pulse generators will also be high. The high outputs of the pulse generators 29*b* through 29*h* are coupled to the inputs of the buffer amplifiers 167*b* through 167*h*, respectively. The outputs of the buffer amplifiers 167*b* through 167*h* are, therefore, low and are coupled to the input terminals A of power amplifiers 38*b* through 38*h*, respectively. A low on the input terminals A of the power amplifiers 38*b* through 38*h* biases the transistor of the respective power amplifiers into nonconduction, thereby preventing a low, or ground, from appearing at the out terminal C of the power amplifiers 38*b* through 38*h*. In the absence of a low on the output terminals C of the power amplifiers 38*b* through 38*h*, the associated punch coils 99 are not energized and a spacing is indicated on the tape 24 in a non-punch condition.

Hence, in the absence of a low on the input of the pulse generators 29*b* through 29*h*, a high is coupled to the buffer amplifiers 167*b* through 167*h*, respectively, which results in low being coupled to the input terminals A of the power amplifiers 38*b* through 38*h*, respectively. The continued presence of the low on the input terminals A of the power amplifiers 38*b* through 38*h* precludes the appearance of a low on the output terminals C of the power amplifiers 38*b* through 38*h*.

When the GO "flip-flop" 33 is switched to the "1" state due to the set input coupled from the AND gate 32, the output of the "flip-flop" is also coupled to the OR gate 37 and enables the gate to couple an OR gate output to one of the inputs of the AND gate 39.

The DELAY circuit 34, in response to the low fed from the pickup amplifier 31 subsequently develops an output pulse after a delayed period which is coincident with the time required for transmitting the coded intelligence on the input gates 28*a* and 28*j* to the tape perforator 23 and, further, with the time required to effect the physical punching of the tape 24.

The coincidence of the inputs to the AND gate 39 from the DELAY circuit 34 and the OR gate 37 enables the AND gate 39 to develop an output pulse which resets the GO "flip-flop" 33 so that an output no longer appears from the "flip-flop."

The output pulse of the AND gate 39 is also coupled to the input terminal A of the reset gate 41 (FIG. 10), whereby the gate responds and develops a negative potential on the output terminal B of the gate. The negative potential at the output of the reset gate 41 is coupled to each of the input terminals C of the holding circuits 27*a*-27k (FIG. 4). Since ground or a low appears on the data line *a* and the feed line *j* at the output terminal C of the holding circuits 27*a* and 27*j*, a considerable portion of the holding circuit current is drawn away from the output unit of the data system 21. The decrease in holding current is sufficient to release the silicon controlled rectifier of the data system output unit.

The remaining data lines *b* through *h* and the no-feed line *k* are high at the output unit of the data system 21, therefore, draw no holding current. Hence, the appearance of the negative to the terminals C of the holding circuit 27*b* through 27*h* and 27*k* has no effect upon the system. In this manner, the output unit of the data system 21 is reset in preparation for the establishment of subsequent coded intelligence for the next punching procedure.

The output of the AND gate 39 is also coupled to the set input of the RESPONSE "flip-flop" 36 to set the "flip-flop" whereby output pulses from the "flip-flop" are coupled to the input terminals A of the RESPONSE generators 42*a* and 42*b* (FIGS. 8 and 9). The RESPONSE generators 42*a* and 42*b* develop pulses which are coupled to the data system over lines *m* and *n*, respectively, to instruct the data system that the punching procedure has been completed and the tape perforator 23 is prepared to receive the next bit of coded intelligence to effect the next punching operation.

In the event erroneous intelligence is transmitted over the data and feed lines *a* through *j*, the data system 21 detects internally the transmission of the erroneous intelligence and places a pulse, or ground, on the no-feed line *k* at the output unit of the data system. The holding circuit 27*k* provides holding current for the no-feed intelligence and couples a low to the input terminal A of the driver no-go circuit 43. The driver no-go circuit 43 responds to a low input and develops a low output on the output terminal B. The low output from the no-go circuit 43 is coupled to the input terminal B of each of the power amplifiers 38*a* through 38*j*, whereby the amplifiers are inhibited from operating due to the presence of the low on the input terminal B. In this manner, as previously discussed, the punching of the erroneous intelligence into the tape 24 is prevented.

The low output from the holding circuit 27*k* is also coupled to the OR gate 37 which is enabled to feed the pulse to one of the inputs of the AND gate 39. As previously discussed, the output of the DELAY circuit 34 is not dependent upon the completion of a punching operation but is dependent upon the clock pulse developed through the pickup coil 108 of the tape perforator 23. An output pulse from the DELAY circuit 34 is subsequently coupled to the other input of the AND gate 39 where the coincidence of the inputs from the DELAY circuit and the OR gate 37 to the AND gate 39 enables the gate 39 to develop the output signal. The output signal of the AND gate 39 is fed to the GO "flip-flop" 33, the RESPONSE "flip-flop" 36 and the reset gate 41, whereby the converter 26 and the data system 21 are prepared for the next transmission of intelligence of the next punching operation. Therefore, erroneous intelligence never reaches the tape perforator 23 and the converter 26 by depending upon the clock pulse rather than the completion of a punching operation controls the operation to preclude punching of the erroneous intelligence and, further, resets the output unit of the data system 21 for the next punching operation.

The data processing system 21 includes a circuit for monitoring the tape tension during a perforating operation and also includes a circuit for monitoring the code permutation punched in the tape. Further, the data processing system 21 includes a circuit which indicates a tape feed operation for preparing the leading and trailing ends of the punched tapes. Referring to FIG. 12, the tape tension control circuit of the data processing system 21 is connected to an output line *p* and the permutation check control circuit is connected to an output line *r*. In the specific embodiment as disclosed, the tension control and permutation check circuits are not utilized, therefore, the output lines *p* and *r* are connected to negative potential V15 to simulate a permanent condition of proper tape tension and proper code permutation.

In the preparation of punched tape, the leading and trailing ends of the tape are specially prepared to facilitate subsequent handling of the tape. The tape feed operation circuit within the data processing system 21 is connected to an output line *s* which is connected to the negative potential V15 through a resistor 171 and is also connected to one side of a normally open, manually operable switch 172. The other side of the switch 172 is connected to ground.

In preparing the leader of a punched tape, an operator closes the switch 172 which connects the output line *s* to ground and controls the tape feed operate circuit within the data processing system 21 to prepare the leading end of the tape. Thereafter, the operator opens the switch 172 to connect the output line *s* to the negative potential V15 which biases off the tape feed operation. Thereafter, the data processing system 21 transmits coded intelligence to effect the punching operation in accordance with the previous discussion. Subsequent to the completion of the entire punching operation, the operator again closes the switch 172 to initiate the tape feed operation, whereby the trailing end of the tape is prepared for subsequent handling.

It is to be understood that the circuit configuration of the converter relates to a specific embodiment but other circuits and systems may be designed by those skilled in the art without departing from the spirit and scope of the invention.

What is claimed is:

1. A circuit for receiving coded intelligence from an intelligence producing system and transmitting the intelligence to a tape perforator during an interval when the perforator is in an intelligence receptive mood, which comprises:

means for inhibiting the transmission of the coded intelligence to the tape perforator, and means responsive to a pulse developed in the tape perforator indicative of the intelligence receptive mood of the perforator and to the transmission of data from the intelligence producing system for enabling the inhibiting means to release the coded intelligence, whereby the coded intelligence is transmitted to the tape perforator during the interval when the tape perforator is in an intelligence receptive mood to to effect a tape perforating operation.

2. A circuit for receiving coded intelligence from an intelligence producing system, and developing the coded intelligence into a series of coded control pulses for controlling the operation of a tape perforator, which comprises:

means for inhibiting the transmission of the coded intelligence from the intelligence producing system to the tape perforator in the form presented by the intelligence producing system, means responsive to the transmitted coded intelligence from the intelligence producing system for generating coded pulses to operate selected punches of the tape perforator in accordance with the intelligence transmitted from the intelligence producing system, and means responsive to an intelligence receptive mood signal generated periodically by the tape perforator and to the transmission of coded intelligence from the intelligence producing system for enabling the inhibiting means to transmit the coded intelligence to the coded signal pulse producing means.

3. A circuit for transforming coded intelligence from an intelligence producing system into coded control pulses for operating punches of a tape perforator in accordance with the produced intelligence, which comprises:

means responsive to the transmitted coded intelligence for generating coded pulses for operating selected punches of the tape perforator, means for inhibiting the transmission of the coded intelligence from the intelligence producing system to the pulse generating means, means responsive to the coincidental application of signals indicative of an intelligence receptive mood of the tape perforator and the transmission of coded intelligence from the intelligence producing system for enabling the inhibiting means so that the coded intelligence is transmitted to the pulse generating means, whereby coded pulses are generated to operate the selected tape perforator punches in accordance with the transmitted coded intelligence, and means responsive to the tape perforating operation for resetting the intelligence producing system upon the completion of the tape perforating operation so that the intelligence producing system transmits new coded intelligence representative of the next tape perforating operation.

4. A circuit for receiving coded intelligence from an intelligence producing system and transmitting the intelligence to a tape perforator to effect a tape perforating operation, which comprises:

means for holding the coded intelligence in a pattern as transmitted by the intelligence producing system, means for transforming the coded intelligence into coded pulses for operating punches of the tape perforator in accordance with the coded intelligence, means for inhibiting the transmission of the coded intelligence to the pulse transforming means, means responsive to a periodic pulse generated by the tape perforator indicative of an intelligence receptive mood of the tape perforator for enabling the inhibiting means to transmit the coded intelligence to the pulse transforming means, and means responsive to the completion of the tape perforating operation for resetting the holding means, whereby the coded intelligence presented to the intelligence producing system is released in preparation of the presentation of new coded intelligence.

5. A circuit for receiving coded intelligence from an intelligence producing system and transmitting the intelligence to a tape perforator during an interval when the perforator is in an intelligence receiving mood, which comprises:

means for inhibiting the transmission of the coded intelligence to the tape perforator, means responsive to a pulse developed in the tape perforator indicative of the intelligence receptive mood of the perforator and to the transmission of data from the intelligence producing system for enabling the inhibiting means to release the coded intelligence so that a tape perforating operation is effected, means responsive to the completion of the perforating operation for:

(a) disenabling the inhibiting means to inhibit the further transmission of coded intelligence, and (b) resetting the intelligence producing system upon the completion of the tape perforating operation so that the system may prepare for the subsequent transmission for the next bit of coded intelligence, and means for delaying the application of the developed tape perforator pulse to the inhibiting disabling and intelligence system resetting means for a period sufficient to effect the tape perforating operation so that the inhibiting means is not disenabled and intelligence producing system is not reset until the tape perforating operation is effected.

6. A circuit for receiving coded intelligence from an intelligence producing system and transmitting the intelligence to a tape perforator during a period when the tape perforator is in an intelligence receptive mood to effect a tape perforating operation, which comprises:

means for holding the coded intelligence in a pattern as transmitted by the intelligence producing system, means for transforming the coded intelligence into coded pulses for operating punches of the tape perforator in accordance with the coded intelligence, means for inhibiting the transmission of the coded intelligence to the pulse transforming means, means responsive to a periodic pulse generated by the tape perforator indicative of an intelligence receiving mood of the tape perforator for enabling the inhibiting means to transmit the coded intelligence to the pulse transforming means, means for resetting the holding means to release the coded intelligence transmitted by the intelligence producing system, and means responsive to the completion of the tape perforating operation for:

(a) disenabling the inhibiting means to prevent further transmission of coded intelligence, (b) actuating the resetting means to reset the holding means so that the coded intelligence is released, and (c) resetting the intelligence producing system upon the completion of the tape perforating operation so that the system may prepare the next bit of coded intelligence for a subsequent tape perforating operation.

7. A circuit for receiving coded intelligence from an intelligence producing system and transmitting the intelligence to a tape perforator during a period when the perforator is in an intelligence receptive mood for effecting a tape perforating operation, which comprises:

a gate circuit for inhibiting the transmission of the coded intelligence from the intelligence producing system to the tape perforator, means for enabling the gate circuit to transmit the coded intelligence to the tape perforator, and an AND gate responsive to the coincidential application of a pulse generated by the tape perforator to indicate the intelligence receptive mood of the perforator and a signal developed by the intelligence producing system indicative of the transmission of the coded intelligence, whereby the AND gate develops an output signal which actuates the enabling means to enable the gate circuit to transmit the coded intelligence to the tape perforator.

8. A circuit for receiving coded intelligence from an intelligence producing system and transmitting the intelligence to a tape perforator during a period when the perforator is in an intelligence receptive mood for effecting a tape perforating operation, which comprises:

a gate circuit for inhibiting the transmission of the coded intelligence from the intelligence producing system to the tape perforator, means for enabling the gate circuit to transmit the coded intelligence to the tape perforator, a first AND gate responsive to the coincidental application of a signal from the tape perforator indicative of the intelligence receptive mood of the perforator and a signal from the intelligence producing system indicative of the transmission of coded intelligence from the system for enabling the gate circuit to transmit the coded intelligence to the tape perforator, and a second AND gate responsive to the coincidental application of a signal indicative of the enabling of the gate circuit and a signal indicative of the completion of the perforating operation, so that an output signal is developed by the second AND gate to:

(a) disenable the gate circuit to inhibit further transmission of the coded intelligence, and (b) reset the intelligence producing system upon the completion of the tape perforating operation so that the system may prepare and present the next bit of coded intelligence for a subsequent tape perforating operation.

9. A circuit for receiving coded intelligence from an intelligence producing system and transmitting the intelligence to a tape perforator during the period when the tape perforator is in an intelligence receptive mood for effecting a tape perforating operation, which comprises:

a gate circuit for inhibiting the transmission of the coded intelligence from the intelligence producing system to the tape perforator, means for enabling the gate circuit to transmit the coded intelligence from the gate circuit to the tape perforator, a first AND gate responsive to the coincidental application of a signal developed by the tape perforator indicative of the intelligence receptive mood of the perforator and a signal developed by the intelligence producing system indicative of the transmission of coded intelligence from the system, whereby a signal is developed to actuate the enabling means to enable the gate circuit to transmit the coded intelligence to the tape perforator to effect the perforating operation, a second AND gate responsive to the coincidental application of a signal indicative of the enabling of the gate circuit and the signal developed by the tape perforator, so that an output signal is developed by the second AND gate to:

(a) disenable the gate circuit to inhibit further transmission of the coded intelligence, and (b) reset the intelligence producing system upon the completion of the tape perforating operation so that the system may prepare and present the next bit of coded intelligence for a subsequent tape perforating operation, and a delay circuit for delaying the application of the signal developed by the tape perforator to the second AND gate for a period sufficient to accomplish the tape perforating operation, whereby the gate circuit is not disenabled and the intelligence producing system is not reset until the perforating operation is effected.

10. A circuit for receiving coded intelligence from an intelligence producing system and transmitting the intelligence to a tape perforator during a period when the perforator is in an intelligence receptive mood for effecting a tape perforating operation, which comprises:

a gate circuit for inhibiting the transmission of the coded intelligence from the intelligence producing system to the tape perforator, a pulse generator for generating pulses in accordance with the coded intelligence where the generated pulses control and operate selected punches of the tape perforator to effect the perforating operation, means for enabling the gate circuit to transmit the coded intelligence from the gate circuit to the pulse generator, and an AND gate responsive to the coincidental application of a pulse generated by the tape perforator to indicate the intelligence receptive mood of the perforator and a signal developed by the intelligence producing system indicative of the transmission of the coded intelligence, so that the AND gate develops an output signal which actuates the enabling means to enable the gate circuit to transmit the coded intelligence to the pulse generator whereby perforator punch control signals are generated to effect the perforating operation in accordance with the transmitted coded intelligence.

11. A circuit for receiving coded intelligence from an intelligence producing system and transmitting the intelligence to a tape perforator during a period when the perforator is in an intelligence receptive mood for effecting a tape perforating operation, which comprises:

a gate circuit for inhibiting the transmission of the coded intelligence from the intelligence producing system to the tape perforator, a pulse generator for generating pulses in accordance with the coded intelligence where the generated pulses control and operate selected punches of the tape perforator to effect the perforating operation, means for enabling the gate circuit to transmit the coded intelligence from the gate circuit to the pulse generator, a first AND gate responsive to the coincidental application of a pulse generated by the tape perforator to indicate the intelligence receptive mood of the perforator and a signal developed by the intelligence producing system indicative of the transmission of the coded intelligence, so that the first AND gate develops an output signal which actuates the enabling means to enable the gate circuit to transmit the coded intelligence to the pulse generator whereby perforator punch control signals are generated to effect the perforating operation in accordance with the transmitted coded intelligence, and a second AND gate responsive to the coincidental application of a signal indicative of the enabling of the gate circuit and a signal indicative of the completion of the tape perforating operation, so that an output signal is developed by the second AND gate to:

(a) disenable the gate circuit to inhibit further transmission of the coded intelligence, and (b) reset the intelligence producing system upon the completion of the tape perforating operation so that the system may prepare and present the next bit of coded intelligence for a subsequent tape perforating operation.

12. A circuit for receiving coded intelligence from an intelligence producing system and transmitting the intelligence to a tape perforator during a period when the perforator is in an intelligence receptive mood for effecting a tape perforating operation, which comprises:

a gate circuit for inhibiting the transmission of the coded intelligence from the intelligence producing system to the tape perforator, a pulse generator for generating pulses in accordance with the coded intelligence where the generated pulses control and operate selected punches of the tape perforator to effect the perforating operation, means for enabling the gate circuit to transmit the coded intelligence from the gate circuit to the pulse generator, a first AND gate responsive to the coincidental application of a pulse generated by the tape perforator to indicate the intelligence receptive mood of the perforator and a signal developed by the intelligence producing system indicative of the transmission of the coded intelligence, so that the first AND gate develops an output signal which actuates the enabling means to enable the gate circuit to transmit the coded intelligence to the pulse generator whereby perforator punch control signals are generated to effect the perforating operation in accordance with the transmitted coded intelligence, a second AND gate responsive to a signal indicative of the enabling of the gate circuit and the pulse generated by the tape perforator, so that an output signal is developed by the second AND gate to:

(a) disenable the gate circuit to inhibit further transmission of the coded intelligence, and (b) reset the intelligence producing system upon the completion of the tape perforating operations so that the system may prepare the next bit of coded intelligence for a subsequent tape perforating operation, and a delay circuit for delaying the application of the generated perforator pulse to the second AND gate for a period sufficient to effect the perforating operation so that the output signal of the second AND gate does not disenable the gate circuit and reset the intelligence producing system until the tape perforating operation has been completed.

13. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, means for enabling the gate circuit to transmit the coded intelligence to the tape perforator, and an AND gate responsive to the coincidental application of:

(a) a pulse developed by the tape perforator indicative of the intelligence receptive mood of the perforator, and (b) a signal developed by the intelligence producing signal indicative of the transmission of coded intelligence from the system, so that the AND gate develops a signal which actuates the enabling means to enable the gate circuit to transmit the coded intelligence to the tape perforator to effect a tape perforating operation.

14. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, means for enabling the gate circuit to transmit the coded intelligence to the tape perforator, a first AND gate responsive to a signal developed by the tape perforator indicative of the intelligence receptive mood of the perforator and a signal developed by the intelligence producing signal indicative of the transmission of coded intelligence from the system, so that the first AND gate develops a signal which actuates the enabling means to enable the gate circuit to transmit the coded intelligence to the tape perforator to effect a tape perforating operation, and a second AND gate responsive to the coincidental application of a signal indicative of the enabling of the gate circuit and a signal indicative of the completion of the tape perforating operation, so that an output signal is developed by the second AND gate to:

(a) disenable the gate circuit to prevent further transmission of the coded intelligence to the tape perforator, (b) release the coded intelligence held in the transmitted pattern by the holding circuit, and (c) reset the intelligence producing system upon the completion of the tape perforating operation so that the system may prepare and present the next bit of coded intelligence for a subsequent tape perforating operation.

15. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, means for enabling the gate circuit to transmit the coded intelligence to the tape perforator, a first AND gate responsive to a pulse developed by the tape perforator indicative of the intelligence receptive mood of the perforator and a signal developed by the intelligence producing signal indicative of the transmission of coded intelligence from the system, so that the first AND gate develops a signal which actuates the enabling means to enable the gate circuit to transmit the coded intelligence to the tape perforator to effect a tape perforating operation, and a second AND gate responsive to the coincidental application of a signal indicative of the enabling of the gate circuit and the pulse developed by the tape perforator to:

(a) disenable the gate circuit to prevent further transmission of the coded intelligence to the tape perforator, (b) release the coded intelligence held in the transmitted pattern by the holding circuit, and (c) reset the intelligence producing system upon the completion of the tape perforating operation so that the system may prepare and present the next bit of coded intelligence for a subsequent tape perforating operation, and a delay circuit for delaying the application of the developed perforator pulse to the second AND gate so that the output signal of the second AND gate does not disenable the gate circuit, release the holding circuit and reset the intelligence producing system until the perforating operation has been completed.

16. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, means for enabling the gate circuit to transmit the coded intelligence to the tape perforator, a first AND gate responsive to a pulse developed by the tape perforator indicative of the intelligence receptive mood of the perforator and a signal developed by the intelligence producing system indicative of the transmission of coded intelligence from the system, so that the first AND gate develops a signal which actuates the enabling means to enable the gate circuit to transmit the coded intelligence to the tape perforator to effect a tape perforating operation, a reset gate for releasing the coded intelligence held by the holding circuit, and a second AND gate responsive to a signal indicative of the enabling of the gate circuit and to a signal indicative of the completion of the tape perforating operation, so that an output signal is developed by the second AND gate to:

(a) disenable the gate circuit to prevent further transmission of the coded intelligence to the tape perforator, (b) actuate the reset gate so that the gate releases the coded intelligence held by the holding circuit, and (c) reset the intelligence producing system upon the completion of the tape perforating operation so that the system may prepare and present the next bit of coded intelligence for a subsequent tape perforating operation.

17. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, means for enabling the gate circuit to transmit the coded intelligence to the tape perforator, a first AND gate responsive to a pulse developed by the tape perforator indicative of the intelligence receptive mood of the perforator and a signal developed by the intelligence producing system indicative of the transmission of coded intelligence from the system, so that the first AND gate develops a signal which actuates the enabling means to enable the gate circuit to transmit the coded intelligence to the tape perforator to effect a tape perforating operation, a reset gate for releasing the coded intelligence held by the holding circuit, a second AND gate responsive to a signal indicative of the enabling of the gate circuit and to the pulse developed by the perforator, so that an output signal is developed by the second AND gate to:

(a) disenable the gate circuit to prevent further transmission of the coded intelligence to the tape perforator, (b) actuate the reset gate so that the gate releases the coded intelligence held by the holding circuit, and (c) reset the intelligence producing system upon the completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gate does not disenable the gate circuit, actuate the reset gate and reset the intelligence producing system until the perforating operation is completed.

18. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, a pulse generator for generating pulses in accordance with the coded intelligence where the generated pulses control and operate selected punches of the tape perforator to effect the perforating operation, means for enabling the gate circuit to transmit the coded intelligence to the pulse generator, a first AND gate responsive to a pulse developed by the tape perforator indicative of the intelligence receptive mood of the perforator and a signal developed by the intelligence producing system indicative of the transmission of coded intelligence from the system, so that the first AND gate develops a signal which actuates the enabling means to enable the gate circuit to transmit the coded intelligence to the pulse generator to generate the pulses necessary to effect a tape perforating operation, a reset gate for releasing the coded intelligence held by the holding circuit, and a second AND gate responsive to a signal indicative of the enabling of the gate circuit and to a signal indicative of the completion of the tape perforating operation, so that an output signal is developed by the second AND gate to:

(a) disenable the gate circuit to prevent further transmission of the coded intelligence to the tape perforator, (b) actuate the reset gate so that the gate releases the coded intelligence held by the holding circuit, and (c) reset the intelligence producing system upon the completion of the tape perforating operation so that the system may prepare and present the next bit of coded intelligence for a subsequent tape perforating operation.

19. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, a pulse generator for generating pulses in accordance with the coded intelligence where the generated pulses control and operate selected punches of the tape perforator to effect the perforating operation, means for enabling the gate circuit to transmit the coded intelligence to the pulse generator, a first AND gate responsive to a pulse developed by the tape perforator indicative of the intelligence receptive mood of the perforator and a signal developed by the intelligence producing system indicative of the transmission of coded intelligence from the system, so that the first AND gate develops a signal which actuates the enabling means to enable the gate circuit to transmit the coded intelligence to the pulse generator to generate the pulses necessary to effect a tape perforating operation, a reset gate for releasing the coded intelligence held by the holding circuit, a second AND gate responsive to a signal indicative of the enabling of the gate circuit and to the pulse developed by the perforator, so that an output signal is developed by the second AND gate to:

(a) disenable the gate circuit to prevent further transmission of the coded intelligence to the tape perforator, (b) actuate the reset gate so that the gate releases the coded intelligence held by the holding circuit, and (c) reset the intelligence producing system upon the completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gate does not disenable the gate circuit, actuate the reset gate and reset the intelligence producing system until the perforating operation is completed.

20. A circuit for receiving coded intelligence from an intelligence producing system and transmitting the intelligence to a tape perforator during a period when the perforator is in an intelligence receptive mood for effecting a tape perforating operation, which comprises:

a holding circuit for holding the coded intelligence in a pattern as transmitted from the intelligence producing system, a gate circuit for inhibiting the transmission of the coded intelligence from the holding circuit to the tape perforator, a pulse generator for generating pulses in accordance with the coded intelligence where the generated pulses control and operate selected punches of the tape perforator to effect the perforating operation, means for enabling the gate circuit to transmit the coded intelligence to the pulse generator, a first AND gate responsive to a pulse developed by the tape perforator indicative of the intelligence receptive mood of the perforator and a signal developed by the intelligence producing system indicative of the transmission of coded intelligence from the system, so that the first AND gate develops a signal which actuates the enabling means to enable the gate circuit to transmit the coded intelligence to the pulse generator to generate the pulses necessary to effect a tape perforating operation, a second AND gate responsive to a signal indicative of the enabling of the gate circuit and to the pulse developed by the perforator, so that an output signal is developed by the second AND gate to:

(a) disenable the gate circuit to prevent further transmission of the coded intelligence to the tape perforator, (b) release the coded intelligence held in the transmitted pattern by the holding circuit, and (c) reset the intelligence producing system upon completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gates does not disenable the gate circuit, actuate the reset gate and reset the intelligence producing system until the perforating operation is completed.

21. A circuit for receiving coded intelligence over a plurality of data lines from an intelligence producing system and transmitting the intelligence to a corresponding plurality of punch controls of a tape perforator when the tape perforator is in an intelligence receiving mood, which comprises:

a plurality of NAND logic gates connected, respectively, to the plurality of data lines for inhibiting the transmission of the coded intelligence to the tape perforator, means connected to each NAND gate for enabling the gate to transmit the coded intelligence to the tape perforator, an AND gate connected to each of the NAND gates, and the AND gate being responsive to the coincidental application of a pulse developed by the tape perforator to indicate the intelligence receptive mood of the perforator and to a signal from the intelligence producing system to indicate the transmission of coded intelligence from the intelligence producing system, so that an output pulse of the AND gate actuates the enabling means to enable the NAND gates to transmit the coded intelligence from the data lines to the respective punch controls of the tape perforator to accomplish the tape perforating operation.

22. A circuit for receiving coded intelligence from an intelligence producing system over a plurality of data lines emanating from the system and transmitting the intelligence to a corresponding plurality of punch controls of a tape perforator during a period when the perforator is in an intelligence receptive mood, which comprises:

a plurality of NAND logic gates connected, respectively, to the plurality of data lines for inhibiting the transmission of the coded intelligence to the tape perforator, means connected to each NAND gate for enabling the gate to transmit the coded intelligence to the tape perforator, a first AND gate having an output connected to each of the NAND gates, the first AND gate being responsive to the coincidental application of a pulse developed by the tape perforator to indicate the intelligence receptive mood of the perforator and a signal from the intelligence producing system to indicate the transmission of coded intelligence from the intelligence producing system, so that an output pulse of the AND gate actuates the enabling means to enable the NAND gates to transmit the coded intelligence from the data lines to the respective punch controls of the tape perforator to accomplish the tape perforating operation, and a second AND gate being responsive to the coincidental application of a signal indicative of the enabling of the NAND gates and a signal indicative of the completion of the tape perforating operation for developing a signal to:

(a) disenable the NAND gates to inhibit further transmission of the coded intelligence to the punch controls of the tape perforator, and (b) reset the intelligence producing system upon completion of the perforating operation in preparation for the transmission of the next bit of coded intelligence.

23. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of NAND logic gates connected, respectively, to the plurality of data lines for inhibiting the transmission of the coded intelligence to the tape perforator, means connected to each NAND gate for enabling the gates to transmit the coded intelligence from the gates, a first AND gate connected to each of the NAND gates, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling the NAND gates to transmit the coded intelligence to the tape perforator punch controls, a second AND gate being responsive to the coincidental application of a signal indicative of the enabling of the NAND gates and the pulse developed by the tape perforator for developing a signal at the output of the second AND gate which:

(a) disenables the NAND gates to inhibit further transmission of the coded intelligence to the tape perforator, and (b) resets the intelligence producing system upon the completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gate does not disenable the NAND gates and reset the intelligence producing system until the perforating operation is completed.

24. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of NAND logic gates connected, respectively, to the plurality of data lines for inhibiting the transmission of the coded intelligence to the tape perforator, means connected to each NAND gate for enabling the gates to transmit the coded intelligence from the gates, an AND gate connected to each of the NAND gates, a corresponding plurality of monostable multivibrators connected, respectively, to outputs of the plurality of NAND logic gates for generating pulses in response to the transmitted coded intelligence, whereby the generated pulses control individual punches of the tape perforator, and the AND gate being responsive to the coincidental application of a pulse developed by the tape perforator indicating the intelligence receptive mood of the perforator and a signal from the intelligence producing system indicative of the transmission of intelligence from the system, so that a signal is developed by the AND gate and actuates the enabling means to enable the NAND gates to transmit the coded intelligence to the respective monostable multivibrators whereby the perforator punch control signals are generated to effect the punching operation.

25. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of NAND logic gates connected, respectively, to the plurality of data lines for inhibiting the transmission of the coded intelligence to the tape perforator, means connected to each NAND gate for enabling the gates to transmit the coded intelligence from the gates, a first AND gate connected to each of the NAND gates, a corresponding plurality of monostable multivibrators connected, respectively, to outputs of the plurality of NAND logic gates for generating pulses in response to the transmitted coded intelligence, whereby the generated pulses control individual punches of the tape perforator, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence to the respective monostable multivibrators whereby the perforator punch control signals are generated, and a second AND gate being responsive to the coincidental application of a signal indicative of the enabling of the NAND gates and a signal indicative of the completion of the perforating operation for developing a signal at the output of the second AND gate which:

(a) disenables the NAND gates to inhibit further transmission of the coded intelligence to the tape perforator, and (b) resets the intelligence producing system upon the completion of the tape perforating operation so that the system may prepare and present the next bit of coded intelligence for a subsequent tape perforating operation.

26. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of NAND logic gates connected, respectively, to the plurality of data lines for inhibiting the transmission of the coded intelligence to the tape perforator, means connected to each NAND gate for enabling the gates to transmit the coded intelligence from the gates, a first AND gate connected to each of the NAND gates, a corresponding plurality of monostable multivibrators connected, respectively, to outputs of the plurality of NAND logic gates for generating pulses in response to the transmitted coded intelligence, whereby the generated pulses control individual punches of the tape perforator, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence to the respective monostable multivibrators whereby the perforator punch control signals are generated, a second AND gate being responsive to the coincidental application of a signal indicative of the enabling of the NAND gates and the pulse developed by the tape perforator for developing a signal at the output of the second AND gate which:

(a) disenables the NAND gates to inhibit further transmission of the coded intelligence to the tape perforator, and (b) resets the intelligence producing system upon the completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gate does not disenable the NAND gates and reset the intelligence producing system until the perforating operation is completed.

27. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, an AND gate connected to each of the NAND gates, and the AND gate being responsive to the coincidental application of a pulse developed by the tape perforator indicating the intelligence receptive mood of the perforator and a signal from the intelligence producing system indicative of the transmission of intelligence from the system, so that a signal is developed by the AND gate and actuates the enabling means to enable the NAND gates to transmit the coded intelligence appearing on the data lines to the respective punch controls of the tape perforator.

28. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, a first AND gate connected to each of the NAND gates, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence appearing on the data lines to the respective punch controls of the tape perforator, and a second AND gate being responsive to the coincidental application of a signal indicative of the enabling of the NAND gates and a signal indicative of the completion of the tape perforating operation for developing a signal at the output of the second AND gate which:

(a) disenables the NAND gates to inhibit further transmission of the coded intelligence to the tape perforator, (b) releases the coded intelligence held in the transmitted pattern within the intelligence producing system by the holding circuit, and (c) resets the intelligence producing system upon the completion of the tape perforating operation so that the system may prepare and present the next bit of coded intelligence for a subsequent tape perforating operation.

29. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, a first AND gate connected to each of the NAND gates, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence appearing on the data lines to the respective punch controls of the tape perforator, a second AND gate being responsive to the coincidental application of a signal indicative of the enabling of the NAND gates and the developed perforator pulse for developing a signal at the output of the second AND gate which:

(a) disenables the NAND gates to inhibit further transmission of the coded intelligence to the tape perforator, (b) releases the coded intelligence held in the transmitted pattern within the intelligence producing system by the holding circuit, and (c) resets the intelligence producing system upon the completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gate does not disenable the gate circuit and reset the intelligence producing system until the perforating operation is completed.

30. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, a first AND gate connected to each of the NAND gates, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence appearing on the data lines to the respective punch controls of the tape perforator, a reset gate connected to the holding circuits for resetting the holding circuits to release the coded intelligence held in the transmitted pattern within the intelligence producing system, and a second AND gate being responsive to the coincidental application of a signal indicative of the enabling of the NAND gates and a signal indicative of the completion of the tape perforating operation for developing a signal at the output of the second AND gate which:

(a) disenables the NAND gates to inhibit further transmission of the coded intelligence to the tape perforator, (b) actuates the reset gate to effect the release of the coded intelligence held in the transmitted pattern within the intelligence producing system by the holding circuit, and (c) resets the intelligence producing system upon the completion of the tape perforating operation so that the system may prepare and present the next bit of coded intelligence for a subsequent tape perforating operation.

31. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, a first AND gate connected to each of the NAND gates, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence appearing on the data lines to the respective punch controls of the tape perforator, a reset gate connected to the holding circuits for resetting the holding circuits to release the coded intelligence held in the transmitted pattern within the intelligence producing system, a second AND gate being responsive to the coincidental application of a signal indicative of the enabling of the NAND gates and the developed perforator pulse for developing a signal at the output of the second AND gate which:

(a) disenables the NAND gates to inhibit further transmission of the coded intelligence to the tape perforator, (b) actuates the reset gate to effect the release of the coded intelligence held in the transmitted pattern within the intelligence producing system by the holding circuit, and (c) resets the intelligence producing system upon the completion of the tape perforating operation so that the system may prepare and present the next bit of coded intelligence for a subsequent tape perforating operation, and a delay circuit for delaying the application of developed perforator pulse to the second AND gate for a period sufficient to effect the perforating operation so that the output signal of the second AND gate does not disenable the gate circuit, actuate the reset gate and reset the intelligence producing system until the perforating operation is completed.

32. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted over the data lines, through the holding circuits to the NAND logic gates, the NAND logic gates inhibiting the transmission of the coded intelligence, means connected to a second input terminal of each of the NAND gates for enabling the gates to transmit the coded intelligence from the gates, a corresponding plurality of monostable multivibrators connected, respectively, to outputs of the plurality of NAND logic gates for generating pulses in response to the transmitted coded intelligence, so that the generated pulses control individual punches of the tape perforator in accordance with the transmitted coded intelligence, an AND gate connected to the input of each NAND gate, and the AND gate being responsive to the coincidental application of a pulse from the tape perforator indicating the intelligence receptive mood of the perforator and a signal from the intelligence producing system indicative of the transmission of coded intelligence from the system, so that a signal is developed by the AND gate and actuates the enabling means to enable the NAND gates to transmit the coded intelligence to the respective monostable multivibrators whereby the perforator punch control signals are generated.

33. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, a first AND gate connected to each of the NAND gates, a corresponding plurality of monostable multivibrators connected, respectively, to outputs of the plurality of NAND logic gates for generating pulses in response to the transmitted coded intelligence, whereby the generated pulses control individual punches of the tape perforator, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence appearing on the data lines to the respective monostable multivibrators whereby the perforator punch control signals are generated, and a second AND gate being responsive to the coincidental application of a signal indicative of the enabling of the NAND gates and a signal indicative of the completion of the tape perforating operation for developing a signal at the output of the second AND gate which:

(a) disenables the NAND gates to inhibit further transmission of the coded intelligence to the tape perforator, (b) releases the coded intelligence held in the transmitted pattern within the intelligence producing system by the holding circuit, and (c) resets the intelligence producing system upon the completion of the tape perforating operation so that the system may prepare and present the next bit of coded intelligence for a subsequent tape perforating operation.

34. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines, a corresponding plurality of NAND logic gates each having a first input terminal connected to the respective holding circuits so that the coded intelligence is transmitted through the holding circuits to the NAND logic gates, the NAND logic gates inhibiting the transmission of the coded intelligence, means connected to a second input terminal of each of the NAND gates for enabling the gates to transmit the coded intelligence from the gates, a corresponding plurality of monostable multivibrators connected, respectively, to outputs of the plurality of NAND logic gates for generating pulses in response to the transmitted coded intelligence, whereby the generated pulses control individual punches of the tape perforator, a first AND gate connected to each of the NAND gates, the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence to the respective monostable multivibrators whereby the perforator punch control signals are generated, a second AND gate responsive to the coincidental application of a signal indicative of the enabling of the NAND gates and the pulse developed by the tape perforator for developing a signal at the output of the second AND gate which:

(a) disenables the NAND gates to inhibit further transmission of the coded intelligence to the tape perforator, (b) releases the coded intelligence held in the transmitted pattern within the intelligence producing system by the holding circuit, and (c) resets the intelligence producing system upon the completion of the tape perforating operation so that the system may prepare and present the next bit of coded intelligence for a subsequent tape perforating operation, and a delay circuit for delaying the application of the developed perforator pulse to the second AND gate for a period sufficient to effect the perforating operation so that the output signal of the second AND gate does not disenable the gate circuit, release the coded intelligence at the holding circuit and reset the intelligence producing system until the perforating operation is completed.

35. A circuit for receiving coded intelligence from an intelligence producing system over a plurality of data lines emanating from the system and transmitting the intelligence to a corresponding plurality of punch controls of a tape perforator during an interval when the perforator is in an intelligence receptive mood, which comprises:

a plurality of individual holding circuits connected, respectively, to the plurality of data lines for holding within the intelligence producing system the pattern of coded intelligence transmitted over the data lines,
a corresponding plurality of NAND logic gates each having a first input terminal connected to the respective holding circuits so that the coded intelligence is transmitted through the holding circuits to the NAND logic gates,
the NAND logic gates inhibiting the transmission of the coded intelligence,
means connected to a second input terminal of each of the NAND gates for enabling the gates to transmit the coded intelligence from the gates,
a corresponding plurality of monostable multivibrators connected, respectively, to outputs of the plurality of NAND logic gates for generating pulses in response to the transmitted coded intelligence, whereby the generated pulses control individual punches of the tape perforator,
a first AND gate connected to each of the NAND gates,
the first AND gate being responsive to the coincidental application of a pulse developed by the tape perforator indicating the intelligence receptive mood of the perforator and a signal from the intelligence producing system indicative of the transmission of intelligence from the system, so that a signal is developed by the first AND gate and actuates the enabling means to enable the NAND gates to transmit the coded intelligence to the respective monostable multivibrators whereby the perforator punch control signals are generated,
a reset gate connected to the holding circuits for resetting the holding circuits to release the coded intelligence held in the transmitted pattern within the intelligence producing system,
a second AND gate responsive to the coincidental application of a signal indicative of the enabling of the NAND gates and the developed perforator pulse for developing a signal at the output of the second AND gate which:

(a) disenables the NAND gates to prevent further transmission of the coded intelligence to the tape perforator,
(b) actuates the reset gate to effect the release of the coded intelligence held in the transmitted pattern with the intelligence producing system by the holding circuit, and
(c) resets the intelligence producing system upon the completion of the tape perforating operation so that the system may prepare and present the next bit of coded intelligence for a subsequent tape perforating operation, and
a delay circuit for delaying the application of the developed perforator pulse to the second AND gate for a period sufficient to effect the perforating operation so that the output signal of the second AND gate does not disenable the gate circuit, actuate the reset gate and reset the intelligence producing system until the perforating operation is completed.

References Cited

UNITED STATES PATENTS

| | | | |
|---|---|---|---|
| 2,742,966 | 4/1956 | Thomas et al. | 234—17 |
| 2,954,824 | 10/1960 | Barry et al. | 234—18 |
| 3,111,262 | 11/1963 | Goldwater | 234—20 |
| 3,175,763 | 3/1965 | Gotz et al. | 234—17 |

GERALD A. DOST, *Primary Examiner.*